April 27, 1954

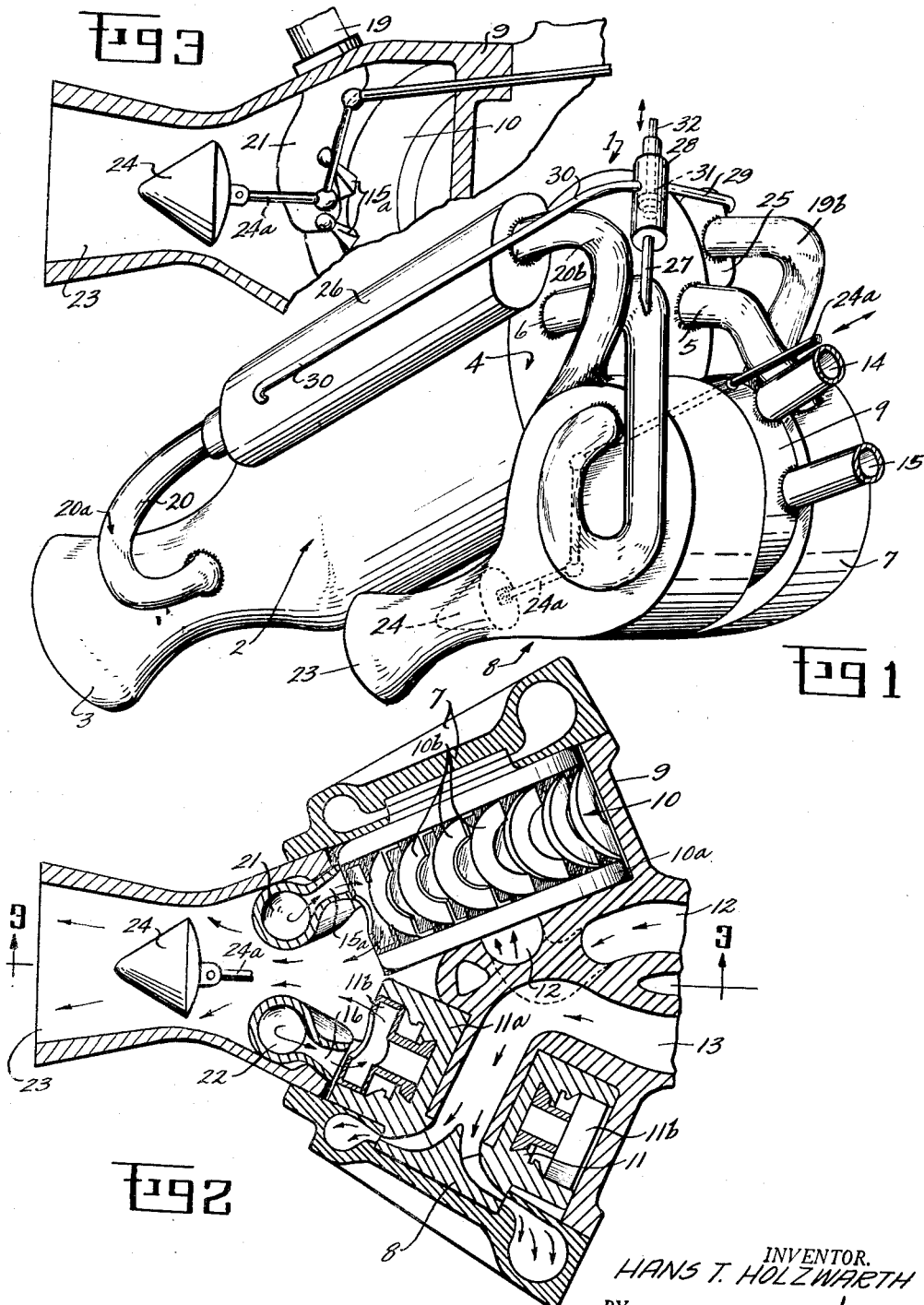

H. T. HOLZWARTH 2,676,456

ROCKET PROPULSION UNIT WITHOUT SEPARATE
GAS GENERATOR FOR TURBOPUMPS

Filed Dec. 11, 1951

INVENTOR.
HANS T. HOLZWARTH
BY
Wade Koontz
Charles H. Wagner
ATTORNEYS

Patented Apr. 27, 1954

2,676,456

UNITED STATES PATENT OFFICE 2,676,456

ROCKET PROPULSION UNIT WITHOUT SEPARATE GAS GENERATOR FOR TURBOPUMPS

Hans T. Holzwarth, Westfield, N. J., assignor to the United States of America as represented by the Secretary of the Air Force Application December 11, 1951, Serial No. 261,068

4 Claims. (Cl. 60—35.6)

The invention described herein may be manufactured and used by or for the Government for governmental purposes without payment to me of any royalty thereon.

This invention relates to rocket motors, and more particularly to liquid fuel rocket motors, and involves improvements relating to means for cooling the combustion chamber gases that are employed for driving the pump turbines that supply the liquid propellants to the combustion chamber, and utilizes one of the liquid propellants to cool or control the maximum temperature of these gases, the arrangement eliminating the use of a separate gas generator for driving the turbopump units. The propellant turbines and pumps are disposed at one side of the main thrust cylinder and gas supply conduits are connected to the main thrust cylinder with their other ends in communication with the interior of the combustion chamber.

It has been proposed to save dry weight in rocket propulsion units by the elimination of a separate gas generator for driving the turbopump unit but when this is ordinarily done by the arrangement of the turbopump unit directly in the jet of the main thrust cylinder, the advantages of apparent simplicity are lessened by design difficulties due to the very high gas temperature and large velocities, by the awkward position of the turbopump unit in the outermost tail end of the aircraft, and by the complications of regulating the pump turbine output by varying the depth of immersion of the turbine blades in the jet.

It has also been proposed to eliminate the gas generator by tapping off gases from the main thrust cylinder and cooling the gases before admission to the turbine, or by cooling the turbine blading, this system resulting in less difficult turbine design, if cooler gases are used, and it improves the position of the turbine pump in relation to the overall design, but difficulties are encountered in attempting to regulate the output of the turbine by a throttling valve, even in comparatively cool gases upstream of the turbine nozzles, and the additional weight of such regulating mechanisms together with the additional weight of the gas coolers would balance any weight savings and simplifications gained by the elimination of the separate gas generator.

In the present invention it is proposed to not only eliminate the separate gas generator, but at the same time permit economical regulation of the turbine output and permit easy and reliable design of the turbine with a minimum in dry weight, and an arrangement in which the turbopump unit is in closest relationship to the injector end of the thrust cylinder, and in addition, utilizing the thrust energy remaining in the gases after they leave the pump turbine blading to augment the thrust of the rocket propulsion unit.

An object of the invention therefore, is the provision of a gas turbine driven pump means for liquid fuel rockets in which the propellant gases from the main rocket chamber are delivered to the pump turbine driving blades to drive the same, the gases passing into and through mixing chamber before reaching the pump turbine blading, in which the mixing chamber is connected to the delivering side of at least one pump to deliver at least one of the liquid propellants from the pumps into the mixing chambers to reduce the gas temperature therein.

Another object is the provision of control valve means in the propellant delivery connection to the mixing chamber to control the amount of propellant so delivered.

A further object is the provision of a discharge nozzle arranged to discharge the pump turbine actuating gases in the same direction as the discharge nozzle for the main rocket chamber, to augment the thrust thereof.

A still further object is the provision of control valve means movably mounted in the pump turbine discharge nozzle for varying the pressure in the turbine casing to vary and control the speed of the pump turbines.

Other objects and advantages of the invention will become apparent from the following description and accompanying drawings in which like reference characters refer to like parts in the several figures:

Figure 1 is a perspective view of a liquid fuel rocket motor having my invention incorporated therein;

Figure 2 is an enlarged fragmentary horizontal longitudinal sectional view taken through a portion of the turbopump unit illustrating the arrangement of the turbine buckets;

Figure 3 is an enlarged fragmentary sectional view taken approximately on line 3—3 of Figure 2; and, Figure 4 is a plan view of the apparatus shown in Figure 2.

Figure 4:
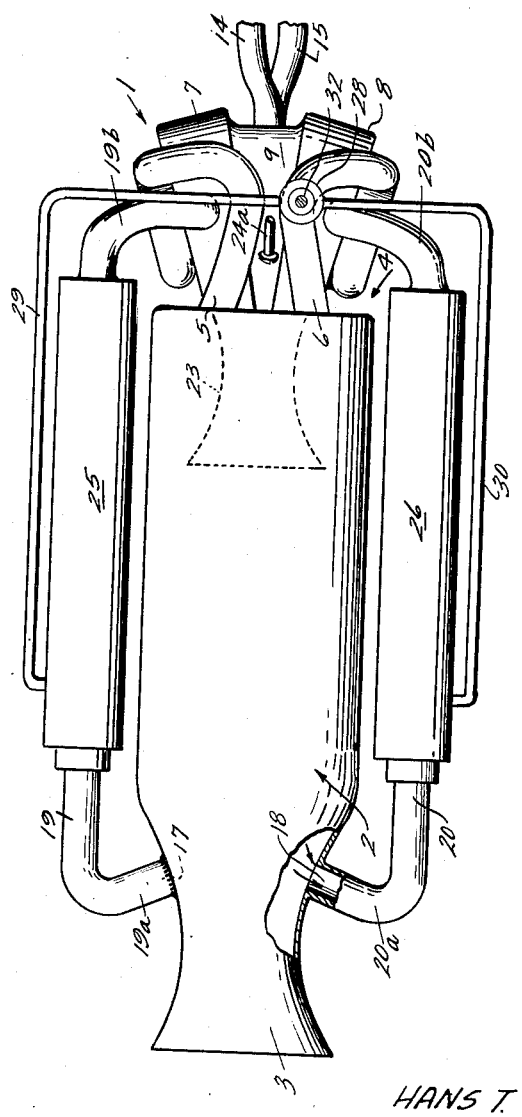

In the drawings the reference numeral 1 denotes a liquid fuel rocket motor having a combustion or thrust chamber 2 with a restricted discharge outlet or nozzle 3 extending rearwardly therefrom. Fuel propellants are supplied into the forward end 4 of the combustion chamber through propellant pump delivery conduits 5 and 6 leading from centrifugal propellant pumps 7 and 8 forming a part of a turbo propellant pump unit disposed below the forward end 4 of the combustion chamber 2.

The propellant pump unit is best seen in Figures 1 and 2 and includes a gas turbine casing 9, formed to receive two gas turbines 10 and 11 for driving the two propellant pumps, the casing being cored to provide passages therethrough, as indicated at 12 and 13, communicating respectively at one end with the propellant centrifugal pumps 7 and 8, the opposite ends being connected to propellant delivery conduits 14 and 15 for supplying the propellants to the pumps from any suitable supply means, such as reservoirs or tanks (not shown). During operation of the rocket motor the propellants forming the combustible fuel mixture, preferably liquid fuel or fuels and an oxidizer, are delivered to the pumps 7 and 8, respectively, through the conduits 14 and 15, the respective pump delivering the propellants through the pump delivery conduits 5 and 6 into the forward end 4 of the combustion chamber where they are mixed and burned in the usual manner to produce pressure, the combustion gases being discharged under high pressure at high velocity through the restricted, somewhat Venturi shaped discharge nozzle 3, creating forward thrust.

The gas turbines 10 and 11 drive the propellant pumps 7 and 8 direct, the pumps and turbines being located on angularly disposed axes inclining rearwardly and outwardly from the pump unit casing axis, as shown in Figure 2, each turbine having a bucket impeller wheel 10a and 11a with semi-circular buckets 10b and 11b disposed to receive gas under pressure from the combustion chamber 2 through plural nozzles or jets 15a and 16 located adjacent the outer opposite sides of turbine casing 9. Combustion gases for driving the gas turbines are discharged from the combustion chamber 2 through apertures 17 and 18 located in the converging portion of the discharge nozzle 3, as seen in Figure 4, where the gas velocity is relatively low and are injected into the forwardly extending portions of the turbine gas supply conduits 19 and 20. These conduits 19 and 20 are curved at 19a and 20a to extend forwardly along the opposite sides of the combustion chamber 2 and then curve downwardly, as at 19b and 20b, and are integrally connected to the gas manifolds 21 and 22 within the turbine casing. The manifolds are formed with the turbine gas discharge nozzles or jets 15a and 16 for directing the gases into the turbine wheel buckets from which they issue toward the center of the turbine casing intermediate the two gas manifolds 21 and 22 and are discharged rearwardly through the restricted discharge nozzle 23 in the same direction as the discharge nozzle 3, producing forward thrust in addition to the thrust from the main thrust chamber of the rocket motor 1. An adjustable cone or back pressure control device 24 is mounted on a rod 24a for axial positioning within the turbine discharge nozzle or throat 23 for varying the throat opening between the restricted portion of the nozzle and the cone 24 to control the pressure within the turbine casing.

The gas delivery conduits 19 and 20 each having a mixing, or gas cooling, chamber intermediate its ends. These mixing chambers are indicated at 25 and 26 and permit gas from the thrust chamber 2 entering the bent conduits 19 and 20 to mix and react chemically with the coolant before entering the turbine manifolds and before its discharge from the nozzles 15a and 16 and impingement on the turbine buckets 10b and 11b.

One of the propellants is utilized as a coolant to reduce the temperature of the gases leaving the combustion chamber through the conduits 19 and 20 before they reach the turbine wheels 10 and 11. As shown in Figure 1 a small conduit 27 is connected to the propellant delivery conduit 6 intermediate the outlet conduit for the propellant pump 8 and the mixing chambers 25 and 26, this conduit 27 being connected to a distributing and control valve chamber 28 and formed with branch coolant delivery conduits 29 and 30 extending rearwardly along the outer sides of the two mixing chambers 25 and 26, being in communication with the interior of the mixing chambers 25 and 26, respectively, at their rear ends.

The valve chamber 28 contains a valve member 31 which is adjustable by a rod 32 relative to the diametrically opposite outlets to the conduits 29 and 30 to adjust the rate of propellant coolant injected into the mixing chambers 25 and 26. The propellant entering the mixing chambers, mixing with the gases passing from the thrust chamber 2 through the conduits 19 and 20 to the turbines 10 and 11 control the maximum safe operating temperatures of the gases driving the turbines.

With respect to the "coolant propellant," the reduction of the temperature of the tapped gases to levels suitable for turbine propulsion by injection of one of the propellants results in mixing ratios which will vary considerably from the stoichiometric mixture ratio. Depending upon the choice of either fuel or acid rich mixtures the specification of materials for the turbopump components able to withstand the corroding action, etc., of the propulsion gases will present some difficulties. For the sake of simplicity and design it was contemplated to use only the more advantageous of the two propellants to accomplish the desired reduction in the temperature of the turbine driving fluid.

In operation the relatively cooled gases from the nozzles 15a and 16 impinge upon the outer ends of the buckets 10b, 11b, flowing therefrom inwardly toward the central plane of the turbopump unit where they merge. They continue their flow without further change in a rearward direction toward the turbine exhaust nozzle 23. This exhaust is used to augment the main thrust.

The needle valve 24, which is arranged in the throat of the nozzle 23 is adjusted to vary the back pressure of the turbine, providing a convenient means for a coarse regulation of the turbine output. Fine regulation is accomplished by variation of the amount of coolant gases admitted to the mixing chambers. This is accomplished by adjusting the position of the coolant control valve 31.

Having thus described the invention and advantages thereof, it will be understood that the invention is not to be limited to the details herein disclosed, as various minor changes may be made without departing from the spirit of the invention and it is not intended to limit its scope other than by the terms of the appended claims.

What I claim is:

1. In a rocket apparatus, a thrust chamber having a discharge nozzle facing rearwardly; a pair of gas delivery conduits connected to the thrust chamber adjacent the said discharge nozzle, a pair of gas turbines having an enclosing casing formed with a gas discharge opening merging rearwardly into a common discharge nozzle facing rearwardly, said turbines each including bucket wheels having curved buckets for receiving gas from one of the gas supply conduits and directing the gas rearwardly toward the common discharge nozzle; a liquid propellant pump connected to each turbine to be driven thereby, liquid propellant supply conduits connected between the propellant pumps and the thrust chamber for supplying liquid propellants to the thrust chamber for combustion therein, and liquid conduit means connected at one end of the propellant supply conduits, and to both of said gas supply conduits at its other end for introducing a portion of the liquid propellant from the said one of the propellant supply conduits into both of the gas supply conduits to reduce the temperature of gas supplied therethrough to the gas turbines from the thrust chamber.

2. Apparatus as claimed in claim 1 including regulating means in the propellant supply conduit for controlling the rate of delivery of the propellant into the gas supply conduits, and also including pressure regulating means in the common discharge nozzle for the gas turbines for regulating the turbine gas pressures to control the operation of the gas turbines and propellant pumps.

3. In a rocket apparatus, a thrust chamber having a discharge outlet; a liquid propellant pump chamber; propellant pumps in said pump chamber each having propellant delivery conduit means in communication with the thrust chamber for delivering liquid fuel propellants into the thrust chamber to form a combustible mixture therein; a bucket type gas turbine connected to each of said pumps to drive the same; a gas turbine casing surrounding the turbines having a common gas discharge outlet facing in the same direction as the thrust chamber discharge outlet; gas discharge jet nozzles formed in the turbine casing for directing gas into the turbine buckets to drive the turbine; gas supply conduits connected at one end to the thrust chamber in spaced relation to the discharge outlet, each conduit being connected at its opposite end to the turbine gas discharge jet nozzles, said gas supply conduits each having an enlarged mixing chamber formed therein intermediate its ends; a propellant supply conduit connected at one end to one of the propellant delivery conduit means, a pair of branch conduits extending from the propellant supply conduit, each branch conduit being connected to one of the mixing chambers for introducing one of the propellants into both of the mixing chambers to cool the gases passing therethrough from the thrust chamber; adjustable valve means mounted in said propellant conduit means for regulating the propellant flow therein, a needle valve shiftable axially in the common discharge outlet for regulating the rate of discharge from the common discharge outlet to vary the turbine back pressure to control the rate of operation of the turbine by the thrust chamber pressure; means for adjusting said propellant delivery conduit valve means, and means for adjusting said needle valve means.

4. In a liquid fuel rocket apparatus, and elongated cylindrical thrust chamber having a restricted discharge outlet facing rearwardly; a pair of gas delivery conduits connected to the thrust chamber adjacent the discharge outlet having inlet openings facing forwardly to receive gas under pressure from the thrust chamber, said conduits being curved to extend forwardly at opposite sides of the thrust chamber, each forwardly extending portion having an enlarged chamber forming a gas and propellant mixing chamber, a gas turbine and pump casing disposed at the forward end of the thrust chamber, having a restricted gas discharge outlet facing in the same direction as the thrust chamber discharge outlet, a pair of gas driven turbines mounted within the gas turbine casing for rotation on oppositely, rearwardly, inclined axes disposed in a common plane, said turbines comprising bucket wheels having curved buckets disposed transverse to the direction of turbine wheel rotation; turbine gas delivery jets disposed adjacent the opposite outer sides of the turbine casing for directing gas into the outer ends of the buckets adjacent the sides of the casing, for delivery thereof by the buckets adjacent the center of the casing and toward the casing outlet; communicating conduit means between each of said gas delivery conduits and the delivery jets for each of the turbines; a liquid propellant pump connected to each of said bucket wheels to be driven thereby; separate propellant supply conduit means for delivering a separate propellant to each propellant pump; separate propellant delivery conduits means between each propellant pump and the forward end of the thrust chamber for delivering the propellants into the thrust chamber, a separate propellant delivery conduit connected in communication with the interior of one of the aforesaid propellant delivery conduits; and a pair of propellant delivery conduits connected to the separate propellant delivery conduit with their opposite ends in communication with the interior of the said mixing chambers.

References Cited in the file of this patent

UNITED STATES PATENTS

| Number | Name | Date |
| --- | --- | --- |
| 2,131,781 | Lysholm | Oct. 4, 1938 |
| 2,411,227 | Planiol et al. | Nov. 19, 1946 |
| 2,450,950 | Goddard | Oct. 12, 1948 |
| 2,523,009 | Goddard | Sept. 19, 1950 |
| 2,523,010 | Goddard | Sept. 19, 1950 |
| 2,585,626 | Chilton | Feb. 12, 1952 |